United States Patent Office 3,188,323
Patented June 8, 1965

3,188,323
DIHYDRODIBENZOTHIAZEPINES
Francis A. Sowinski, Edison, and Harry L. Yale, New Brunswick, N.J., assignors to Olin Mathieson Chemical Corporation, New York, N.Y., a corporation of Virginia
No Drawing. Filed Feb. 12, 1963, Ser. No. 257,848
11 Claims. (Cl. 260—327)

This application is a continuation-in-part of application Serial No. 86,003, filed January 31, 1961, and now abandoned.

This invention relates to new basically substituted dihydrodibenzothiazepines (and their salts) having valuable therapeutic properties, processes for the preparation thereof and new intermediates useful in such processes.

The therapeutically active compounds of this invention include dihydrodibenzothiazepines of the general Formula I:

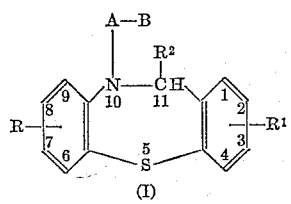
(I)

wherein A is a lower alkylene radical of at least two carbon atoms, B is a basic saturated nitrogen-containing radical of less than twelve carbon atoms, R and $R^1$ are the same or different and represent hydrogen, halogen, lower alkyl, lower alkoxy, lower alkylmercapto or trifluoromethyl, and $R^2$ is $R^3$-phenyl, that is,

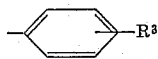

$R^3$ being hydrogen, halogen, lower alkoxy and lower alkylmercapto; and salts thereof. Among the suitable radicals represented by the symbol B are: amino, (lower alkyl)-amino, e.g., methylamino, ethylamino and the like; di(lower alkyl)amino, e.g., dimethylamino, diethylamino and the like; phenyl-lower alkylamino, e.g., benzylamino, phenethylamino and the like; as well as saturated nitrogen heterocyclics having 5 to 7 atoms in the ring and which may have one additional nitrogen in the ring. A simple substituent may also be attached to the nitrogen heterocyclic.

Heterocyclics represented by B are those having the formula

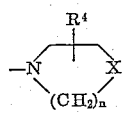

in which X represents NH or $CH_2$, $n$ represents 1, 2 or 3 and $R^4$ represents hydrogen, lower alkyl, lower alkoxy, hydroxy-lower alkyl, lower alkanoyloxy-lower alkyl, hydroxy-lower alkoxy-lower alkyl and di(lower alkyl)amino-lower alkoxy-lower alkyl. These may be exemplified by piperidyl [i.e., piperidino, 2-piperidyl, 3-piperidyl and 4-piperidyl]; (lower alkyl)piperidyl [e.g., 2, 3, or 4-(lower alkyl)piperidino or 2, 3, or 4-(N-lower alkyl)piperidyl]; or 2,3, or 4-(N-lower alkyl-2,3 or 4-(lower alkyl)piperidyl]; (lower alkoxy)piperidyl; pyrrolidyl; (lower alkyl)-pyrrolidyl; (lower alkoxy)pyrrolidyl; piperazyl; (lower alkyl)piperazyl (e.g., $N^4$-methylpiperazino); di(lower alkyl)piperazyl; (lower alkoxy)piperazyl; (hydroxy-lower alkyl)piperazyl [e.g., $N^4$-(2-hydroxyethyl)piperazino]; (lower alkanoyloxyalkyl)piperazyl [e.g., $N^4$-(2-acetoxyethyl)piperazino]; (hydroxy-lower alkoxy-lower alkyl) piperazyl [e.g., $N^4$-(2-hydroxyethoxyethyl)piperazino]; di-(lower alkyl)amino-(lower alkoxy-lower alkyl)piperazyl [e.g., $N^4$-(2-dimethylaminoethoxyethyl)piperazino]; and homopiperazyl. The terms "lower alkyl," "lower alkoxy," and "lower alkylene," as employed herein, include both straight and branched chain radicals of less than eight carbon atoms. All four halogens are contemplated.

Preferred are those compounds wherein $R^2$ is phenyl and particularly preferred are those wherein, in addition, A is a lower alkylene radical of two to three carbon atoms (i.e., ethylene, trimethylene-1,3 and propylene-1,2); B represents a di(lower alkyl)amino radical, $N^4$-(lower alkyl)piperazino radical, $N^4$-(2-hydroxyethyl)piperazino radical, or an $N^4$-(2-acetoxyethyl)piperazino, R is in the 8-position and represents hydrogen, chloro or trifluoromethyl, and $R^1$ is hydrogen.

As to the salts of the dihydrodibenzothiazepines, those coming within the purview of this invention include the acid-addition salts, particularly, the non-toxic acid-addition salts. Acids useful for preparing the acid-addition salts, include, interalia, inorganic salts, such as the hydrohalic acids (e.g., hydrochloric and hydrobromic acid), sulfuric acid, nitric acid and phosphoric acid, and organic acids, such as oxalic, fumaric, maleic, tartaric, citric, acetic, pamoic and succinic acids.

The compounds of this invention are therapeutically active compounds which are utilizable as ataractic agents and thus may be used in the treatment of depressed psychotic states. For these purposes they may be administered orally or parenterally as the free base or physiologically acceptable acid addition salts in conventional dosage forms such as tablets, capsules, injectables or the like by incorporating the appropriate dose of the compound with carriers according to accepted pharmaceutical practice.

The compounds of this invention are prepared by a series of reactions as shown by the following equations, wherein the symbols have the same meaning as hereinbefore defined:

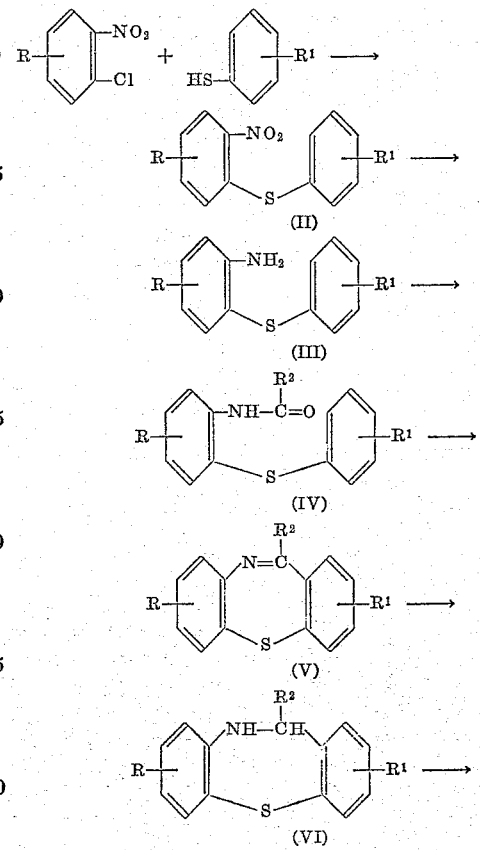

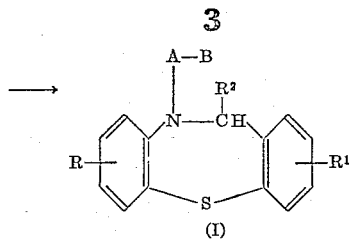

(I)

Among the suitable o-chloronitrobenzenes utilizable as initial reagents in these reactions may be mentioned: o-chloronitrobenzene; halo-o-chloronitrobenzenes, such as 2,5-dichloronitrobenzene, 2,4-dichloronitrobenzene, 2-chloro-5-fluoronitrobenzene, and 2-chloro-4-fluoronitrobenzene; (lower alkyl)-o-chloronitrobenzenes, such as 5-(lower alkyl)-2-chloronitrobenzenes (e.g., 5-methyl-2-chloronitrobenzene, 5-ethyl-2-chloronitrobenzene, 5-n-propyl-2-chloronitrobenzene and 5-n-hexyl-2-chloronitrobenzene) and 4-(lower alkyl)-2-chloronitrobenzenes; (lower alkoxy)-2-chloronitrobenzenes, such as 5-(lower alkoxy)-2-chloronitrobenzenes (e.g., 5-methoxy-2-chloronitrobenzene, 5-ethoxy-2-chloronitrobenzene, 5-n-propoxy-2-chloronitrobenzene and 5-n-hexyloxy-2-chloronitrobenzene); 5-(lower alkylmercapto)-2-chloronitrobenzenes (e.g., 5-methylmercapto-2-chloronitrobenzene); and trifluoromethyl-2-chloronitrobenzenes, such as 5-trifluoromethyl-2-chloronitrobenzene and 4-trifluoromethyl-2-chloronitrobenzene.

Among the suitable benzenethiols utilizable as initial reagents in these reactions may be mentioned; benzenethiol; halobenzenethiols, such as 2-chlorobenzenethiol, 4-chlorobenzenethiol, 2-fluorobenzenethiol, 4-fluorobenzenethiol, and 2-bromobenzenethiol; (lower alkyl)benzenethiols, such as o-toluenethiol, p-toluenethiol, 2-ethylbenzenethiol, 4-n-propylbenzenethiol and 4-n-hexylbenzenethiol; (lower alkoxy) benzenethiols, such as 2-methoxybenzenethiol, 4-methoxybenzenethiol, 4-ethoxybenzenethiol and 4-propoxybenzenethiol; and trifluoromethylbenzenethiols, such as 2-trifluoromethylbenzenethiol and 4-trifluoromethylbenzenethiol.

In the initial reaction of the process of this invention, the o-chloronitrobenzene is reacted with the benzenethiol, the reaction preferably being conducted in the presence of a condensation agent such as a base (e.g., sodium hydroxide), whereby a corresponding 2-nitrophenyl sulfide (Compounds II) is formed. The nitro group is then reduced to an amino group by treatment with a reducing agent such as nascent hydrogen, which may be formed in situ by the action of an electropositive metal on an acid, thereby forming the corresponding 2-(phenylthio)-aniline derivative (Compounds III).

The 2-(phenylthio)aniline is reacted with a benzoyl halide or substituted benzoyl halide, e.g., benzoyl chloride, chlorobenzoyl chloride, methoxybenzoyl bromide, ethylmercaptobenzoyl bromide, etc., whereby the corresponding acylated aniline derivative (Compounds IV) is formed.

Compounds IV are then cyclized by treatment with a mixture of polyphosphoric acid and phosphorous oxychloride at an elevated temperature (preferably about 100° C.) to yield the corresponding dibenzo[b,f][1,4]thiazepine derivatives (Compounds V). Compounds V are then reduced, as by treatment with a mixture of lithium aluminum hydride and aluminum chloride, to yield the corresponding 10,11-dihydrodibenzo[b,f][1,4]thiazepine derivatives (Compounds VI), which are new intermediates of this invention.

Compounds VI are then treated with a basically substituted alkyl halide of the formula: B—A halide, wherein B and A are as hereinbefore defined, the reaction preferably being conducted in the presence of a basic condensation reagent such a sodamide or sodium hydride. The same compounds can alternatively be prepared in two steps, by first reacting with an alkylene dihalide of the formula: (halide)—A—(halide) and then with a base of the formula: BH. To prepare the acid-addition salts, the resulting base is treated with the desired acid in the usual manner.

The following examples illustrate the invention (all temperatures being in centigrade).

EXAMPLE 1

*8-methoxy-10,11-dihydro-11-phenyldibenzo[b,f] [1,4]thiazepine*

(a) *Preparation of 4-methoxy-2-nitrophenyl phenyl sulfide.*—To 211 g. of 2-chloro-5-methoxynitrobenzene and 110.2 g. of benzenethiol in 500 ml. 95% ethanol is added a solution of 44 g. of sodium hydroxide in 100 ml. of water, the mixture is refluxed for two and one-half hours, cooled and the solid filtered to give 280.4 g. of product.

(b) *Preparation of 5-methoxy-2-(phenylthio)aniline.*—To 261.2 g. of 4-methoxy-2-nitrophenyl sulfide, 558 g. of iron powder and 2 l. of 95% ethanol is added 25 ml. of concentrated hydrochloric acid, dropwise. Subsequently, the mixture is heated to 55° and the spontaneous exothermic reaction which occurs is controlled by cooling. When the spontaneous reaction has subsided, the mixture is refluxed for three hours, filtered and the filtrate concentrated to give about 227 g. of product.

(c) *Preparation of 5-methoxy-2-(phenylthio)benzanilide.*—217.2 g. of 5-methoxy-2-(phenylthio)aniline in 500 ml. of benzene is added to a mixture of 168 g. of benzoyl chloride and 480 ml. of 10% aqueous sodium hydroxide. The mixture is shaken vigorously, the benzene solution is separated, dried and concentrated to give about 300 g. of product.

(d) *Preparation of 8-methoxy-11-phenyldibenzo[b,f] [1,4]thiazepine.*—A well blended mixture of 50.0 g. of 5-methoxy-2-(phenylthio)benzanilide, 400 g. of polyphosphoric acid and 58.3 g. phosphorous oxychloride is heated for one and one-half hours under nitrogen by means of an oil bath maintained at 120–125°. Much foaming occurs and must be controlled. The cooled mixture is treated with crushed ice, made strongly alkaline with concentrated ammonia and extracted with ether. The ether extracts are dried and concentrated to give about 53 g. of product.

(e) *Preparation of 8-methoxy-10,11-dihydro-11-phenyl-dibenzo[b,f][1,4]thiazepine.*—15.9 g. of 8-methoxy-11-phenyldibenzo[b,f][1,4]thiazepine in 100 ml. of dry ether is added dropwise to 3.9 g. of lithium aluminum hydride and 13.3 g. of aluminum chloride in 100 ml. of dry ether. The conventional working up gives about 16.2 g. of product.

EXAMPLE 2

*10,11-dihydro-8-(trifluoromethyl)-11-(4-chlorophenyl) dibenzo[b,f][1,4]thiazepine*

(a) *Preparation of phenyl-α,α,α-trifluoro-2-nitro-p-tolyl sulfide.*—To 60.5 g. of benzenethiol, 123.9 g. of 4-chloro-3-nitrobenzotrifluoride and 500 ml. of 95% ethanol is added 20 g. of sodium hydroxide in 50 ml. of water. The reaction mixture is then refluxed for two hours and worked up to give the crude product, M.P. about 69–70°. An analytical sample from absolute ethanol melts at about 70–71°.

*Anal.*—Calcd. for $C_{13}H_8F_3NO_2S$: S, 10.71. Found: S, 10.52.

(b) *Preparation of α,α,α-trifluoro-6-(phenylthio)-m-toluidine, hydrochloride.*—To a stirred solution of 29.9 g. of phenyl-α,α,α-trifluoro-2-nitro-p-tolyl sulfide in 200 ml. of 90% ethanol is added 55.8 g. of iron powder and 5 ml. of concentrated hydrochloric acid. After the spontaneous reaction which occurs has subsided, the mixture is heated to reflux for two hours and filtered while hot. The filtrate is then cooled and concentrated hydrochloric acid is added until no further precipitation occurs. The yield of air-dried product is about 20.7 g., M.P. about 176–177°.

Anal.—Calcd. for $C_{13}H_{10}FNS \cdot HCl$: S, 10.49. Found: S, 10.66.

(c) *Preparation of α,α,α-trifluoro-6-(phenylthio)-m-(4-chlorbenz)toluidide.*—A mixture of 87.7 g. of α,α,α-trifluoro-6-(phenylthio)-m-toluidine hydrochloride, 200 ml. of benzene, 93 g. of 4-chlorobenzoyl chloride and 480 ml. of 10% aqueous sodium hydroxide are shaken vigorously for 0.5 hour, the benzene layer separated, dried and concentrated to yield about 126.5 g. of product.

(d) *Preparation of 8-(trifluoromethyl)-11-(4-chlorophenyl)-[b,f][1,4]thiazepine.*—A stirred mixture of 540 g. of polyphosphoric acid, 69.6 g. of phosphorous oxychloride and 67.5 g. of α,α,α-trifluoro-6-(phenylthio)-m-(4-chlorobenz)toluidide is heated under nitrogen in an oil bath maintained at 125–130° for 1.5 hours. The mixture is then poured into 2 kg. of finely crushed ice and then made alkaline with concentrated aqueous ammonia and extracted with ether. The extract is subsequently dried, the ether distilled and the residue extracted with ligroin to give, after cooling, about 37.3 g. of product.

(e) *Preparation of 10,11-dihydro-8-(trifluoromethyl)-11-(4-chlorophenyl)dibenzo[b,f][1,4]thiazepine.*—A solution prepared by portionwise addition of 16.0 g. of anhydrous aluminum chloride to 500 ml. of cooled anhydrous ether is gradually added to a stirred suspension of 4.6 g. of lithium aluminum hydride in 500 ml. of ether. To the mixture is added dropwise a solution of 25.2 g. of 8-(trifluoromethyl)-11-(4-chlorophenyl)dibenzo[b,f][1,4]thiazepine in 750 ml. of anhydrous ether. The mixture is stirred for two hours, 20 ml. of water are added dropwise, then 20 ml. of 20% sodium hydroxide, the mixture is filtered, dried and the ether removed by distillation to give about 22.4 g. of product.

EXAMPLE 3

*2-chloro-8-methoxy-10,11-dihydro-11-phenyl-dibenzo [b,f][1,4]thiazepine*

Following the procedure of Example 1, but substituting 120 g. of p-chlorobenzenethiol for the benzenethiol in step a, yields 2-chloro-8-methoxy-10,11-dihydro-11-phenyl-dibenzo[b,f][1,4]thiazepine.

Similarly, if other substituted 2-chloronitrobenzenes are substituted for the 2-chloro-5-methoxynitrobenzene in Example 1, step a, and the remaining steps of the example are carried out, correspondingly substituted 10,11-dihydro-dibenzo[b,f][1,4]thiazepines are prepared. Thus, 5-methyl-2-chloronitrobenzene and 5-methylmercapto-2-chloronitrobenzene yield 8-methyl-10,11-dihydro-11-phenyl-dibenzo[b,f][1,4]thiazepine and 8-methylmercapto-10,11-dihydro-11-phenyl-dibenzo[b,f][1,4]thiazepine, respectively. Whereas if other substituted benzenethiols, e.g., p-toluenethiol, p-methoxybenzenethiol, and p-(trifluoromethyl)benzenethiol and 2-chloronitrobenzene are reacted as in Example 1, step a, and the remaining steps of the example are carried out, there are obtained 2-methyl-10,11-dihydro-11-phenyl-dibenzo[b,f][1,4]thiazepine, 2-methoxy-10,11-dihydro-11-phenyl-dibenzo[b,f][1,4]thiazepine, and 2-(trifluoromethyl)-10,11-dihydro-11-phenyl-dibenzo[b,f][1,4]thiazepine, respectively.

EXAMPLE 4

*10,11-dihydro-11-phenyldibenzo[b,f][1,4]thiazepine*

(a) *Preparation of 2-(phenylthio)benzanilide.*—To 50 ml. of 10% aqueous sodium hydroxide is added 9.0 g. of o-(phenylthio)aniline, 25 ml. of benzene and 5.9 g. of benzoyl chloride. The mixture is shaken about one hour, the benzene solution is separated, dried and concentrated to give 9 g. of crude 2-(phenylthio)benzanilide, M.P. about 59–60°. Recrystallization from 95% ethanol gives the pure product, M.P. about 69–70°.

(b) *Preparation of 11-phenyldibenzo[b,f][1,4]thiazepine.*—Following the procedure of Example 1, step d, but substituting 40 g. of 2-(phenylthio)benzanilide for 5-methoxy-2-(phenylthio)benzanilide, gives 11-phenyldibenzo[b,f][1,4]thiazepine, M.P. about 110–111°.

(c) *Preparation of 10,11-dihydro-11-phenyldibenzo[b,f][1,4]thiazepine.*—A solution of 9.3 g. of anhydrous aluminum chloride in 150 ml. of anhydrous ether is added dropwise to a slurry of 2.66 g. of lithium aluminum hydride in 100 ml. of anhydrous ether and the mixture stirred for five minutes. To this mixture is added 10 g. of 11-phenyldibenzo[b,f][1,4]thiazepine in 200 ml. of anhydrous ether. The reaction mixture is stirred for one hour at room temperature and subsequently for one hour at reflux temperature. The excess reducing agent is then destroyed, the ether solution is filtered and dried. After removal of the ether, the oily residue is crystallized to give about 9 g. of product, M.P. about 105–106°.

Anal.—Calcd. for $C_{19}H_{15}NS$: C, 78.85; H, 5.22; N, 4.84. Found: C, 78.28; H, 5.04; N, 4.97.

EXAMPLE 5

*8-chloro-10,11-dihydro-11-phenyldibenzo[b,f][1,4]thiazepine*

Following the procedure of Example 4, but substituting 9.5 g. of 5-chloro-2-(phenylthio)aniline hydrochloride for the o-(phenylthio)aniline hydrochloride in step a, 8-chloro-10,11-dihydro-11-phenyldibenzo[b,f][1,4]thiazepine is obtained.

EXAMPLE 6

*10,11-dihydro-8-(trifluoromethyl)-11-(4-methylmercaptophenyl)-dibenzo[b,f][1,4]thiazepine*

Following the procedure of Example 2 (c), but substituting 103 g. of 4-methylmercapto benzoyl chloride for the 4-chlorobenzoyl chloride, and the remaining steps of the example are carried out, there is obtained 10,11-dihydro-8-(trifluoromethyl)-11-(4-methylmercaptophenyl)dibenzo[b,f][1,4]thiazepine.

EXAMPLE 7

*2-chloro-8-methoxy-10-(3-dimethylaminopropyl)-10,11-dihydro-11-phenyl dibenzo[b,f][1,4]thiazepine, salt with oxalic acid*

(a) *Preparation of 2-chloro-8-methoxy-10-(3-dimethylaminopropyl)-10,11-dihydro-11-phenyl dibenzo[b,f][1,4]thiazepine.*—A mixture of 17.4 g. of 2-chloro-8-methoxy-10,11-dihydro-11-phenyl-dibenzo[b,f][1,4]thiazepine, 200 ml. of dry toluene and 3.3 g. of sodamide are stirred and refluxed under nitrogen for one-half hour, cooled in ice and 87.5 ml. of a 1.2 M solution of 3-dimethylaminopropyl chloride in toluene added. Subsequently, the mixture is stirred and refluxed for five hours to give about 16.0 g. of 2-chloro-8-methoxy-10-(3-dimethylaminopropyl)-10,11-dihydro-11-phenyl-dibenzo[b,f][1,4]thiazepine.

(b) *Preparation of 2-chloro-8-methoxy-10-(3-dimethylaminopropyl)-10,11-dihydro-11-phenyldibenzo[b,f][1,4]thiazepine, salt with one mole of oxalic acid.*—To a cooled, stirred solution of 15.2 g. of 2-chloro-8-methoxy-10-(3-dimethylaminopropyl)-10,11-dihydro-11-phenyl-dibenzo[b,f,][1,4]thiazepine in anhydrous ether is gradually added 4.6 g. of oxalic acid in 200 ml. of warm acetonitrile. The gum is dried in vacuo, dissolved in 100 ml. of boiling acetonitrile, cooled to 45°, and decanted from the oily material which settles out. To the decanted liquid is added two volumes of anhydrous ether to give about 7.3 g. of the product.

EXAMPLE 8

*10,11-dihydro-10-(3-dimethylaminopropyl)-8-(trifluoromethyl)-11-(4-chlorophenyl)-dibenzo[b,f][1,4]thiazepine, salt with hydrochloric acid*

(a) *Preparation of 10,11-dihydro-10-(3-dimethylaminopropyl)-8-(trifluoromethyl)-11-(4-chlorophenyl)dibenzo[b,f][1,4]thiazepine.*—A mixture of 8.5 g. of 10,11-dihydro-8-(trifluoromethyl)-11-(4-chlorophenyl)

dibenzo[b,f][1,4]thiazepine, 100 ml. of dry toluene and 1.3 g. of sodamide are refluxed for one-half hour, cooled and treated with 37.8 ml. of a 1.2 M solution of 3-dimethylaminopropyl chloride in toluene. The reaction is completed by heating under reflux for five hours. The product isolated in the usual manner weighs about 9.5 g.

(b) *Preparation of 10,11 - dihydro - 10 - (3-dimethylaminopropyl)-8-(trifluoromethyl) - 11-(4 - chlorophenyl) dibenzo[b,f][1,4]thiazepine, hydrochloride.* — The product from (a), 9.5 g. in 100 ml. of dry ether is cooled and treated dropwise with 0.65 g. of hydrogen chloride dissolved in 10 ml. of ether. The solid which separates is filtered and recrystallized from acetone-ether to give 4.1 g. of 10,11-dihydro-10-(3-dimethylaminopropyl)-8-(trifluoromethyl) - 11 - (4-chlorophenyl)dibenzo[b,f][1,4] thiazepine, hydrochloride.

EXAMPLE 9

*10,11 - dihydro - 10-(2-dimethylaminoethyl)-8-(trifluoromethyl) - 11 - (4-methylmercaptophenyl)dibenzo[b,f] [1,4]thiazepine, hydrochloride*

(a) *Preparation of 10,11-dihydro - 10 - (2-dimethylaminoethyl) - 8 - trifluoromethyl - 11-(4-methylmercaptophenyl)dibenzo[b,f][1,4]thiazepine.*—A reaction between 9.9 g. of 10,11-dihydro-8-(trifluoromethyl)-11-(4-methylmercaptophenyl)dibenzo[b,f][1,4]thiazepine, 1.0 g. of sodamide in 100 ml. of dry toluene and 40 ml. of a 0.66 M solution of 2-dimethylaminoethyl chloride in dry toluene gives by the procedure of Example 8 (a), 9.3 g. of 10,11-dihydro - 10-(2-dimethylaminoethyl)-8-(trifluoromethyl)- 11 - (4 - methylmercaptophenyl)dibenzo[b,f][1,4]thiazepine, as an oil.

(b) *Preparation of 10,11-dihydro - 10 - (2-dimethylaminoethyl) - 8 - trifluoromethyl - 11-(4-methylmercaptophenyl)dibenzo[b,f][1,4]thiazepine, hydrochloride.* — The product from (a) 9.3 g., and ethereal hydrogen chloride by the procedure of Example 8 (b) gives 8.4 g. of crude product. Recrystallization from chlorobenzene and then from acetone results in the isolation of pure 10,11-dihydro - 10-(2-dimethylaminoethyl)-8-(trifluoromethyl)- 11 - (4 - methylmercaptophenyl)dibenzo[b,f][1,4]thiazepine, hydrochloride.

EXAMPLE 10

*8 - chloro-10-(2-pyrrolidylethyl)-10,11-dihydro-11-phenyl dibenzo[b,f][1,4]thiazepine, salt with maleic acid*

(a) *Preparation of 8-chloro-10-(2-pyrrolidylethyl)-10, 11 - dihydro-11-phenyl dibenzo[b,f][1,4]thiazepine.*—A mixture of 32.5 g. of 8-chloro-10,11-dihydro-11-phenyl-dibenzo[b,f][1,4]thiazepine, 200 ml. of dry toluene and 4.1 g. of sodamide is refluxed for one-half hour, cooled in ice and treated with 123 ml. of a 0.98 M solution of 2-pyrrolidylethyl chloride in dry toluene. The mixture is stirred and refluxed for five hours, and worked to give 21.9 g. of 8-chloro-10-(2-pyrrolidylethyl)-10,11-dihydro-11-phenyl-dibenzo[b,f][1,4]thiazepine.

(b) *Preparation of 8-chloro-10-(2-pyrrolidylethyl)-10, 11 - dihydro-11-phenyl-dibenzo[b,f][1,4]thiazepine, salt with one mole of maleic acid.*—To a cooled, stirred solution of 21.9 g. of 8-chloro-10-(2-pyrrolidylethyl)-10,11-dihydro-11-phenyl-dibenzo[b,f][1,4]thiazepine in 150 ml. of anhydrous ether is gradually added a warm solution of 7.0 g. of maleic acid in 50 ml. of acetone. The yellow solid is recrystallized from water to give a colorless product.

EXAMPLE 11

*10,11-dihydro-10-(2-dimethylaminoethyl)-8-methoxy-11 - phenyl dibenzo[b,f][1,4]thiazepine, salt with maleic acid*

Following the procedure of Example 10, but substituting 32.0 g. of 10,11-dihydro-8-methoxy-11-phenyl-dibenzo [b,f][1,4]thiazepine for the 8-chloro-10,11-dihydro-11-phenyl-dibenzo[b,f][1,4]thiazepine in step (a), 10,11-dihydro-10-(2-dimethylaminoethyl)-8-methoxy-11- phenyl dibenzo[b,f][1,4]thiazepine is obtained.

Similarly, if other substituted 10,11-dihydro-11-phenyl dibenzo[b,f][1,4]thiazepines are substituted for the 8-chloro - 10,11-dihydro-11-phenyl-dibenzo[b,f][1,4]thiazepine in Examples 7 and 10, the correspondingly substituted 10 - (3-dimethylaminopropyl) - 10,11 - dihydro-11-phenyl dibenzo[b,f][1,4]thiazepines, salt with oxalic acid, and 10 - (2-dimethylaminoethyl) - 10,11 - dihydro-11-phenyl-dibenzo[b,f][1,4]thiazepine, salt with maleic acid are formed, respectively. Thus 2,8-dichloro-10,11-dihydro- 11 - phenyl-dibenzo[b,f][1,4]thiazepine, 8-methyl-10,11-dihydro - 11 - phenyl - dibenzo[b,f][1,4]thiazepine, 8-methoxy-10,11-dihydro - 11 - phenyl-dibenzo[b,f][1,4] thiazepine, 2-methyl - 10,11 - dihydro-11-phenyl-dibenzo [b,f][1,4]thiazepine, 2-methoxy-10,11-dihydro-11-phenyl-dibenzo[b,f][1,4]thiazepine and 2-(trifluoromethyl)-10, 11-dihydro-11-phenyl-dibenzo[b,f][1,4]thiazepine give the correspondingly substituted 10-dialkylaminoalkyl derivatives.

EXAMPLE 12

*8-chloro - 10 - [3 - ($N^4$-methylpiperazino)propyl]-10,11-dihydro - 11 - phenyl dibenzo[b,f][1,4]thiazepine, dihydrochloride*

(a) *Preparation of 8 - chloro-10-[3-($N^4$-methylpiperazino)propyl] - 10,11 - dihydro-11-phenyl dibenzo[b,f] [1,4]thiazepine.*—A suspension of 4 g. of sodamide, 300 ml. of dry toluene and 21.6 g. of 8-chloro-10,11-dihydro-11-phenyl-dibenzo[b,f][1,4]thiazepine is heated on a steam bath for two hours, cooled and a solution of 20 g. of 3-($N^4$-methylpiperazino)propyl chloride in 100 ml. of dry toluene is added dropwise with vigorous stirring. The reaction mixture is then heated under reflux for five hours, the precipitated sodium chloride is filtered and the toluene is then removed to give 8-chloro-10-[3-($N^4$-methylpiperazino)propyl] - 10,11 - dihydro-11-phenyl dibenzo[b,f] [1,4]thiazepine.

() *Preparation of the dihydrochloride salt.*—To a solution of 3.5 g. of 8-chloro-10-[3-($N^4$-methylpiperazino) propyl]-10,11-dihydro - 11 - phenyl-dibenzo[b,f][1,4]-thiazepine in 20 ml. of alcohol there is added an ethereal solution of hydrogen chloride to a pH of 2. Anhydrous ether is added to complete the precipitation of the salt. The solid is recovered by filtration and crystallized from a mixture of acetonitrile and ether to give the dihydrochloride salt.

Similarly, by substituting an equivalent amount of 3-[$N^4$-(2-hydroxyethyl)-piperazino]propyl chloride, 3-[$N^4$-(2-acetoxyethyl)piperazino]propyl chloride, or 3-[$N^4$-(2-hydroxyethoxyethyl)piperazino]propyl chloride for the 3-($N^4$-methylpiperazino)propyl chloride in step *a* of Example 12 and following the procedure of that example, the dihydrochloride salts of 8-chloro-10-{3-[$N^4$-(2-hydroxyethyl)piperazino]propyl}-10,11 - dihydro-11-phenyl dibenzo[b,f][1,4]thiazepine, 8-chloro - 10 - {3-[$N^4$-(2-acetoxyethyl)piperazino]propyl}-10,11 - dihydro-11-phenyl dibenzo[b,f][1,4]thiazepine, and 8-chloro-10-{3[$N^4$-(2-hydroxyethoxyethyl)-piperazino]propyl}-10,11 - dihydro-11-phenyl dibenzo[b,f][1,4]thiazepine are obtained, respectively.

EXAMPLE 13

*10-(3-dimethylaminopropyl)-10,11-dihydro-11-phenyldi-benzo[b,f][1,4]thiazepine, salt with oxalic acid*

(a) *Preparation of 10-(3-dimethylaminopropyl)-10,11-dihydro-11-phenyldibenzo[b,f][1,4]thiazepine.*—A stirred mixture of 5.8 g. of 10,11-dihydro-11-phenyldibenzo [b,f][1,4]thiazepine, 0.86 g. of sodamide and 150 ml. of dry nitrogen for 0.5 hour. The reaction mixture is then cooled and 10 ml. of a 2.6 M solution of 3-dimethylaminopropyl chloride in dry toluene is added, dropwise. Heating and stirring is resumed for 2.5 hours, the reaction mixture is filtered, the filtrate is concentrated in vacuo and the residue is dissolved in 150 ml. of ether. The ether solution is extracted with 100 ml. of 5% hydrochloric acid, the hydrochloric acid extracts are made strongly alkaline and extracted with ether. The ether extracts are dried and concentrated to give about 4.9 g. of 10-(3-dimethylaminopropyl)-10,11-dihydro - 11-phenyldibenzo [b,f][1,4]thiazepine.

Anal.—Calcd. for $C_{24}H_{26}N_2S$: C, 76.95; H, 7.00; N, 7.48. Found: C, 76.55; H, 6.51; N, 7.56.

(b) *Preparation of 10-(3-dimethylaminopropyl)-10,11-dihydro-11 - phenyldibenzo[b,f][1,4]thiazepine, salt with one mole of oxalic acid.*—To a stirred solution of 4.9 g. of 10-(3-dimethylaminopropyl)-10,11-dihydro-11-phenyldibenzo[b,f][1,4]thiazepine in 100 ml. of anhydrous ether is added gradually a solution of 1.39 g. of oxalic acid in 100 ml. of anhydrous ether. The yield of oxalic acid salt is about 2.7 g., M.P. about 196–197° (dec.) after two recrystallizations from n-propanol.

Anal.—Calcd. for $C_{24}H_{26}N_2S \cdot C_2H_2O_4$: C, 67.21; H, 6.07; N, 6.03; S, 6.90. Found: C, 67.74; H, 6.09; N, 5.85; S, 7.18.

EXAMPLE 14

*10-(2-dimethylaminoethyl)-10,11-dihydro-11-phenyldibenzo[b,f][1,4]thiazepine, hydrochloride*

(a) *Preparation of 10-(2-dimethylaminoethyl)-10,11-dihydro-11 - phenyldibenzo[b,f][1,4]thiazepine.*—The reaction is carried out as in Example 13, step a, between 11.3 g. of 10,11-dihydro-11-phenylbenzo[b,f][1,4]thiazepine in 200 ml. of dry toluene, 1.7 g. of sodamide and 32.5 ml. of a 1.8 M solution of 2-dimethylaminoethyl chloride in dry toluene. The yield of 10-(2-dimethylaminoethyl)-10,11-dihydro - 11 - phenyldibenzo[b,f][1,4]thiazepine is about 11.3 g.

(b) *Preparation of 10-(2-dimethylaminoethyl)-10,11-dihydro - 11 - phenyldibenzo[b,f][1,4]thiazepine, hydrochloride.*—To an ice cooled, stirred solution of 11.3 g. of 10-(2-dimethylaminoethyl)-10,11-dihydro-11-phenyldibenzo[b,f][1,4]thiazepine is added dropwise 10.3 ml. of ethereal hydrogen chloride. The product which precipitates is recrystallized once from acetone and twice from acetonitrile-anhydrous ether to give about 5.1 g. of the hydrochloride, M.P. about 164–165°.

Anal.—Calcd. for $C_{23}H_{24}N_2S \cdot HCl$: N, 7.06; S, 8.08. Found: N, 7.25; S, 8.19.

EXAMPLE 15

*10-[2-(N-ethylhomopiperazino)ethyl]-10,11-dihydro-11-phenyldibenzo[b,f][1,4]thiazepine*

By substituting 32.5 ml. of a 1.8 M solution of 2-(N-ethylhomopiperazino)ethyl chloride (prepared by the reaction of N-ethylhomopiperazine with chloroethyl-p-toluenesulfonate) for the 2-dimethylaminoethyl chloride in Example 14a, there is obtained 10-[2-(N-ethylhomopiperazino)ethyl]-10,11 - dihydro-11-phenyldibenzo[b,f][1,4] thiazepine.

EXAMPLE 16

*10-(3-benzylaminopropyl)-10,11-dihydro-11-phenyldibenzo[b,f][1,4]thiazepine*

By substituting 32.5 ml. of a 1.8 M solution of 3-benzylaminopropyl chloride (prepared from benzylamine and trimethylene chlorobromide) for the 2-dimethylethyl chloride in Example 14 (a), there is obtained 10-(3-benzylaminopropyl) - 10,11 - dihydro - 11-phenyldibenzo [b,f][1,4]thiazepine.

EXAMPLE 17

*10-(3-methylaminopropyl)-10,11-dihydro-11-phenyldibenzo[b,f][1,4]thiazepine*

By substituting 32.5 ml. of a 1.8 M solution of 3-methylaminopropyl chloride (prepared from methylamine and trimethylene chlorobromide) for the 2-dimethylethyl chloride in Example 14 (a), 10-(3-methylaminopropyl)-10,11-dihydro - 11 - phenyldibenzo[b,f][1,4]thiazepine is obtained.

What is claimed is:

1. A compound selected from the group consisting of bases of the formula

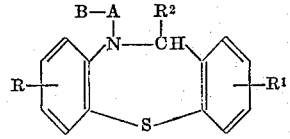

wherein A is lower alkylene of at least two carbon atoms; B is a member of the group consisting of amino, (lower alkyl)amino, di(lower alkyl)amino, phenyl-lower alkylamino, and

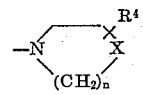

R and $R^1$ each is a member of the group consisting of hydrogen, halogen, lower alkyl, lower alkoxy, lower alkylmercapto and trifluoromethyl; $R^2$ is

$R^3$ is a member of the group consisting of hydrogen, halogen, lower alkoxy and lower alkylmercapto; $R^4$ is a member of the group consisting of hydrogen, lower alkyl, lower alkoxy, hydroxy-lower alkyl, lower alkanoyloxy-lower alkyl and di(lower alkyl)amino-lower alkoxy-lower alkyl; X is a member of the group consisting of NH and $CH_2$; and $n$ is an integer from 1 to 3; and non-toxic acid addition salts of said bases.

2. 10-[di(lower alkyl)amino(lower alkylene)]-10,11-dihydro-11-phenyldibenzo[b,f][1,4]thiazepine.

3. A non-toxic acid addition salt of the compound of claim 2.

4. 10-(3-dimethylaminopropyl) - 10,11 - dihydro - 11 - phenyldibenzo[b,f][1,4]thiazepine.

5. A non-toxic acid addition salt of the compound of claim 4.

6. 10-(3-dimethylaminopropyl) - 10,11 - dihydro - 11 - phenyldibenzo[b,f][1,4]thiazepine oxalate.

7. 10-(2-dimethylaminoethyl) - 10,11-dihydro-11-phenyldibenzo[b,f][1,4]thiazepine.

8. 10-(3-methylaminopropyl) - 10,11-dihydro-11-phenyldibenzo[b,f][1,4]thiazepine.

9. A compound of the formula

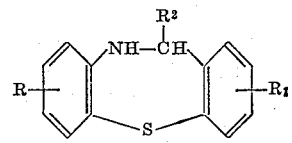

wherein R and $R^1$ each is a member of the group consisting of hydrogen, halogen, lower alkyl, lower alkoxy, lower alkylmercapto and trifluoromethyl; $R^2$ is

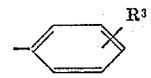

and $R^3$ is a member of the group consisting of hydrogen, halogen, lower alkoxy and lower alkylmercapto.

10. 10,11-dihydro - 11 - phenyldibenzo[b,f][1,4]thiazepine.

11. 10-[(lower alkyl)amino(lower alkylene)]-10,11-dihydro-11-phenyldibenzo[b,f][1,4]thiazepine.

No references cited.

IRVING MARCUS, *Primary Examiner.*

NICHOLAS S. RIZZO, *Examiner.*